United States Patent
Kawamura

(10) Patent No.: US 8,441,688 B2
(45) Date of Patent: May 14, 2013

(54) IMAGE PROCESSING APPARATUS AND METHOD THEREOF

(75) Inventor: Naoto Kawamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1254 days.

(21) Appl. No.: 12/247,063

(22) Filed: Oct. 7, 2008

(65) Prior Publication Data

US 2009/0097052 A1    Apr. 16, 2009

(30) Foreign Application Priority Data

Oct. 16, 2007    (JP) .................................. 2007-269533

(51) Int. Cl.
*H04N 1/405*    (2006.01)

(52) U.S. Cl.
USPC ......... 358/3.06; 350/1.9; 350/3.01; 350/3.03; 350/3.12; 350/3.16; 350/3.19; 350/3.26

(58) Field of Classification Search ....................... None
See application file for complete search history.

(56) References Cited

U.S. PATENT DOCUMENTS

| | | | | |
|---|---|---|---|---|
| 5,587,811 A | * | 12/1996 | Liguori | 358/3.2 |
| 5,859,955 A | * | 1/1999 | Wang | 358/1.9 |
| 2002/0051147 A1 | * | 5/2002 | Asai | 358/1.9 |
| 2005/0094212 A1 | | 5/2005 | Asai | |
| 2005/0219628 A1 | * | 10/2005 | Yasutomi et al. | 358/3.16 |
| 2006/0077469 A1 | * | 4/2006 | Asai et al. | 358/3.06 |
| 2006/0256355 A1 | * | 11/2006 | Karito | 358/1.9 |
| 2007/0019241 A1 | * | 1/2007 | Yamakado | 358/3.14 |

* cited by examiner

*Primary Examiner* — Miya J Cato
(74) *Attorney, Agent, or Firm* — Carter, DeLuca, Farrell & Schmidt LLP

(57) ABSTRACT

A halftone screen applicable to an electrophotographic printer is created. Hence, minimum and maximum sizes of a halftone dot and a cluster size are input. When the halftone-dot size reaches the minimum size, the number of blackened pixels in the halftone dot is calculated. When the halftone-dot size is smaller than the minimum size, or when the number of blackened pixels doesn't reach the cluster size, and the halftone-dot size is smaller than the maximum size, the halftone dot is. When the number of blackened pixels becomes equal to or larger than the cluster size or when the halftone-dot size reaches the maximum size, a halftone screen is partitioned into polygons to have centroids of the halftone dots as kernel points. Then, each halftone dot is grown by blackening pixels to have the centroid as the center of growth.

12 Claims, 16 Drawing Sheets

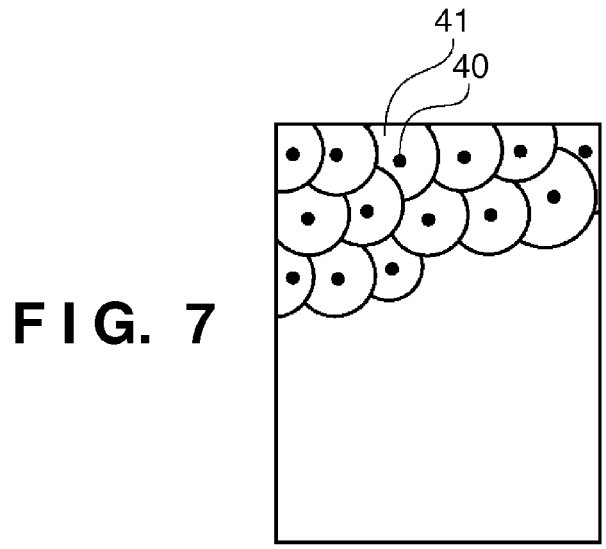

| | | | | 1<br>00 | 2<br>10 | 6<br>20 | 11<br>30 | 18<br>40 | 31<br>50 | 40<br>60 | 75<br>70 | 88<br>80 | 109<br>90 |
|---|---|---|---|---|---|---|---|---|---|---|---|---|---|
| 94<br>-41 | 39<br>-31 | 25<br>-21 | 5<br>-11 | 3<br>01 | 4<br>11 | 7<br>21 | 12<br>31 | 19<br>41 | 32<br>51 | 41<br>61 | 62<br>71 | 87<br>81 | 104<br>91 |
| 95<br>-42 | 54<br>-32 | 26<br>-22 | 16<br>-12 | 9<br>02 | 8<br>12 | 10<br>22 | 17<br>32 | 27<br>42 | 33<br>52 | 48<br>62 | 63<br>72 | 77<br>82 | 101<br>92 |
| 96<br>-43 | 60<br>-33 | 38<br>-23 | 24<br>-13 | 15<br>03 | 13<br>13 | 14<br>23 | 20<br>33 | 28<br>43 | 42<br>53 | 49<br>63 | 68<br>73 | 78<br>83 | 102<br>93 |
| 97<br>-44 | 61<br>-34 | 53<br>-24 | 37<br>-14 | 23<br>04 | 22<br>14 | 21<br>24 | 29<br>34 | 30<br>44 | 46<br>54 | 55<br>64 | 70<br>74 | 81<br>84 | 103<br>94 |
| 123<br>-45 | 93<br>-35 | 59<br>-25 | 52<br>-15 | 36<br>05 | 34<br>15 | 35<br>25 | 43<br>35 | 47<br>45 | 56<br>55 | 66<br>65 | 73<br>75 | 85<br>85 | 110<br>95 |
| 124<br>-46 | 100<br>-36 | 92<br>-26 | 58<br>-16 | 44<br>06 | 45<br>16 | 50<br>26 | 51<br>36 | 57<br>46 | 67<br>56 | 72<br>66 | 83<br>76 | 111<br>88 | 116<br>96 |
| 130<br>-47 | 122<br>-37 | 99<br>-27 | 91<br>-17 | 76<br>07 | 64<br>17 | 65<br>27 | 69<br>37 | 71<br>47 | 74<br>57 | 84<br>67 | 112<br>77 | 117<br>87 | 125<br>97 |
| | 129<br>-38 | 121<br>-28 | 98<br>-18 | 90<br>08 | 89<br>18 | 79<br>28 | 80<br>38 | 82<br>48 | 86<br>58 | 113<br>68 | 118<br>78 | 126<br>88 | |
| | | 128<br>-29 | 120<br>-19 | 115<br>09 | 108<br>19 | 105<br>29 | 106<br>39 | 107<br>49 | 114<br>59 | 119<br>69 | 127<br>79 | | |

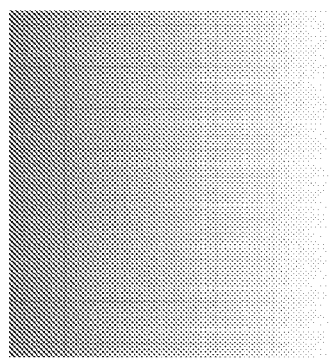 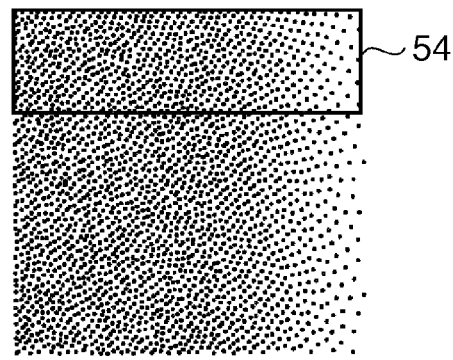
F I G. 10A   F I G. 10B
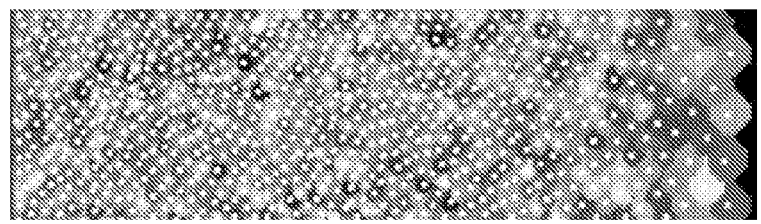
F I G. 11
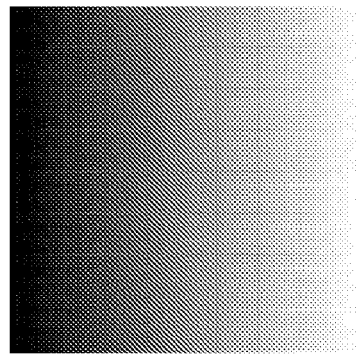 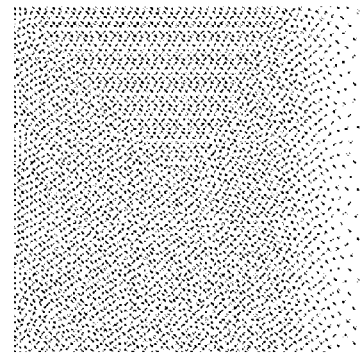
F I G. 12A   F I G. 12B FIG. 13
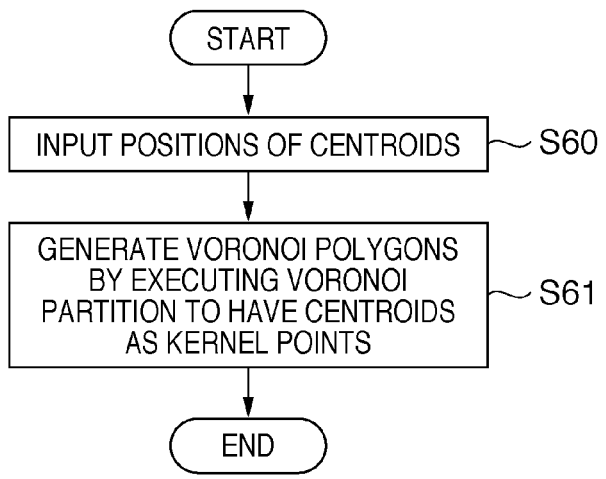
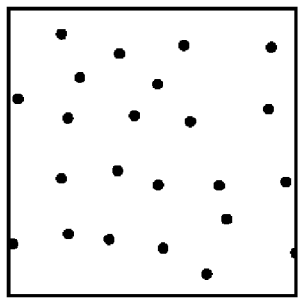
FIG. 14A
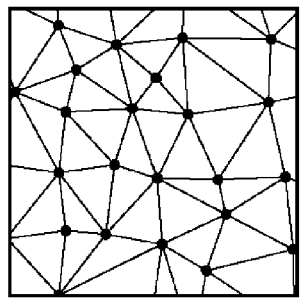
FIG. 14B
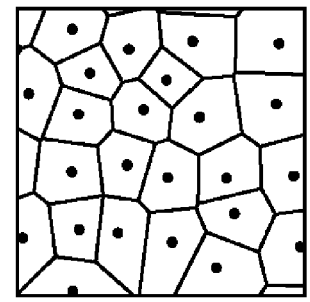
FIG. 14C
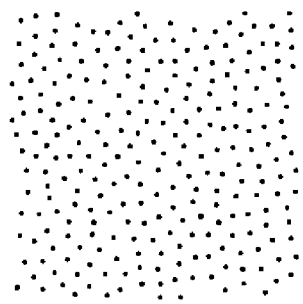
FIG. 15
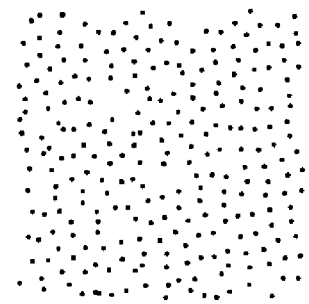
FIG. 16

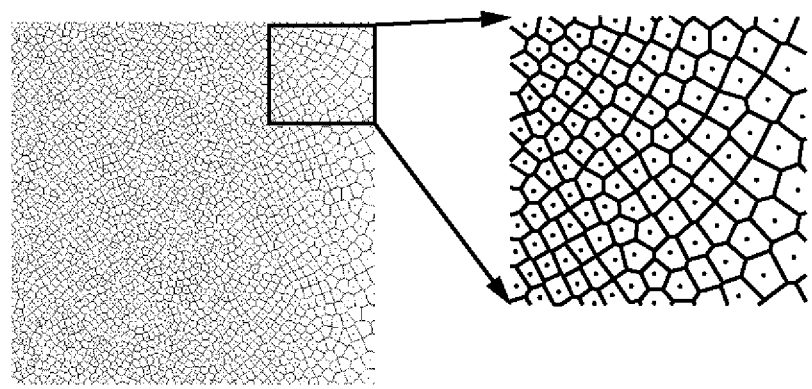
F I G. 20
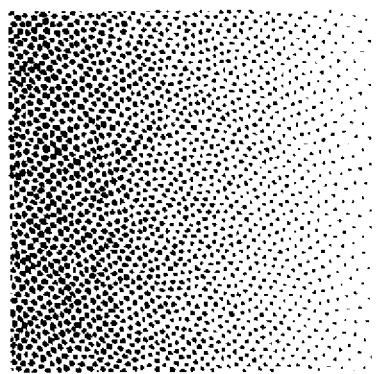 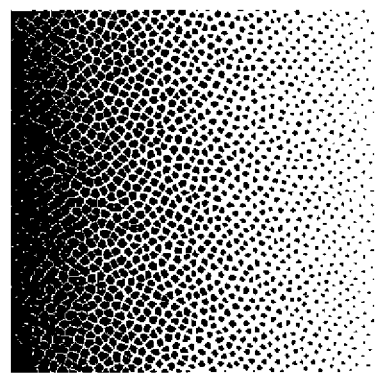
F I G. 21A        F I G. 21B

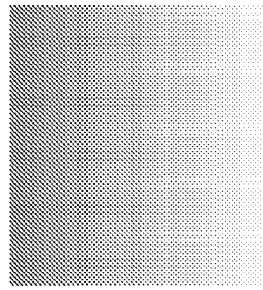
F I G. 25A
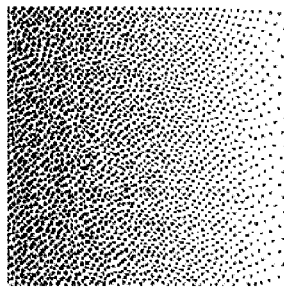
Cmin = 4 × 4
Cmax = 12 × 12
M = 4
N = 1
F I G. 25B
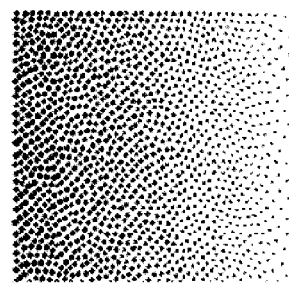
Cmin = 6 × 6
Cmax = 12 × 12
M = 4
N = 1
F I G. 25C
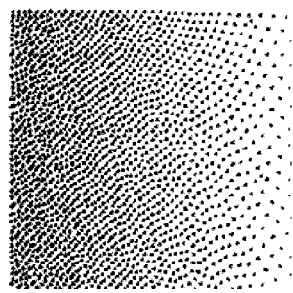
Cmin = 4 × 4
Cmax = 12 × 12
M = 8
N = 1
F I G. 25D

F I G. 26

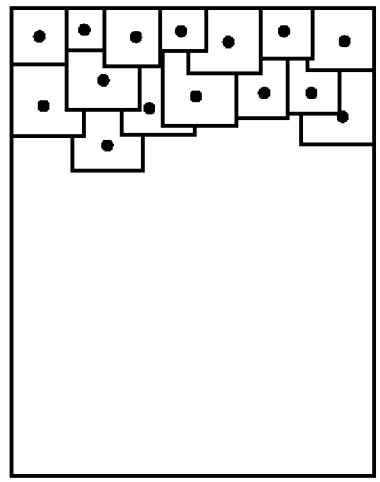

F I G. 27

|  |  |  | 1<br>00 | 2<br>10 | 5<br>20 | 12<br>30 | 20<br>40 | 30<br>50 | 55<br>60 | 71<br>70 | 97<br>80 |
|---|---|---|---|---|---|---|---|---|---|---|---|
| 96<br>-31 | 54<br>-21 | 11<br>-11 | 4<br>01 | 3<br>11 | 6<br>21 | 13<br>31 | 21<br>41 | 31<br>51 | 56<br>61 | 72<br>71 | 98<br>81 |
| 95<br>-32 | 53<br>-22 | 10<br>-12 | 9<br>02 | 8<br>12 | 7<br>22 | 14<br>32 | 22<br>42 | 32<br>52 | 57<br>62 | 73<br>72 | 99<br>82 |
| 94<br>-33 | 52<br>-23 | 19<br>-13 | 18<br>03 | 17<br>13 | 16<br>23 | 15<br>33 | 23<br>43 | 33<br>53 | 58<br>63 | 74<br>73 | 100<br>83 |
| 93<br>-34 | 51<br>-24 | 29<br>-14 | 28<br>04 | 27<br>14 | 26<br>24 | 25<br>34 | 24<br>44 | 34<br>54 | 59<br>64 | 75<br>74 | 101<br>84 |
| 92<br>-35 | 50<br>-25 | 41<br>-15 | 40<br>05 | 39<br>15 | 38<br>25 | 37<br>35 | 36<br>45 | 35<br>55 | 60<br>65 | 76<br>75 | 102<br>85 |
| 91<br>-36 | 49<br>-26 | 48<br>-16 | 47<br>06 | 46<br>16 | 45<br>26 | 44<br>36 | 43<br>46 | 42<br>56 | 61<br>66 | 77<br>76 | 103<br>86 |
| 90<br>-37 | 70<br>-27 | 69<br>-17 | 68<br>07 | 67<br>17 | 66<br>27 | 65<br>37 | 64<br>47 | 63<br>57 | 62<br>67 | 78<br>77 | 104<br>87 |
| 89<br>-38 | 88<br>-26 | 87<br>-18 | 86<br>08 | 85<br>18 | 84<br>28 | 83<br>38 | 82<br>48 | 81<br>58 | 80<br>68 | 79<br>78 | 105<br>88 |
| 117<br>-39 | 116<br>-29 | 115<br>-19 | 114<br>09 | 113<br>19 | 112<br>29 | 111<br>39 | 110<br>49 | 109<br>59 | 108<br>69 | 107<br>79 | 106<br>89 |

F I G. 28
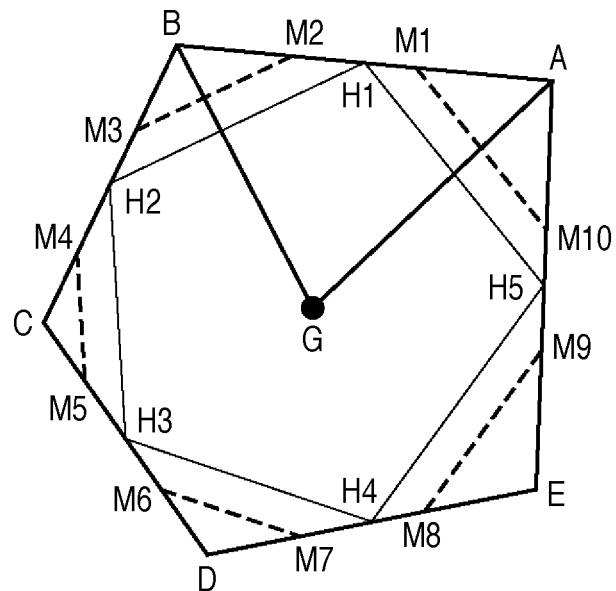
F I G. 29
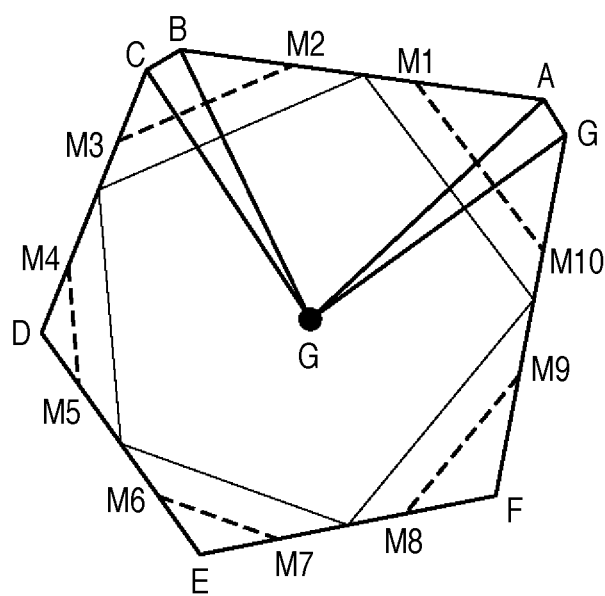

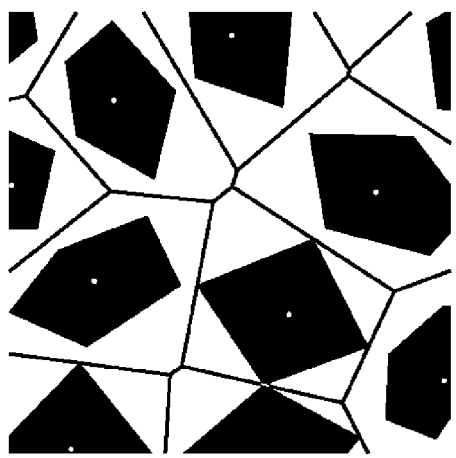 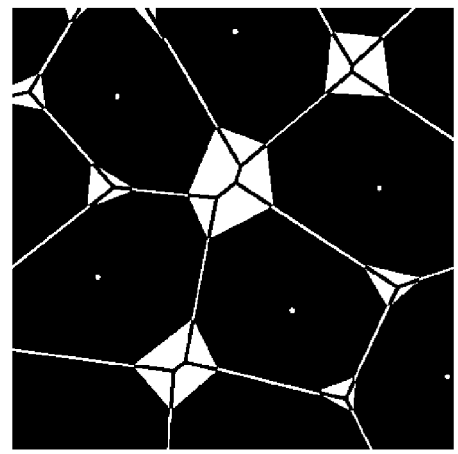
F I G. 30A    F I G. 30B

IMAGE PROCESSING APPARATUS AND METHOD THEREOF

BACKGROUND OF THE INVENTION

1. Field of the Invention

The present invention relates to generation processing of a halftone screen and image processing using the halftone screen.

2. Description of the Related Art

An electrophotographic printing apparatus, which has an exposure process for removing charges from a uniformly charged surface layer of a photosensitive drum, which is made up of an organic photoconductor (OPC), amorphous silicon, or the like, by scanning a light beam, has a non-linear characteristic. Also, complexity of an electrophotography process including development, transfer, fixing, and the like also causes the non-linear characteristic.

With this non-linear characteristic, an interference occurs between print dots. For example, when one isolated dot is to be printed, it is difficult to record such a dot, but dots are reliably recorded in a cluster state of several dots. When a distance between dots is small, toner often moves to connect dots. In a process for recording dots by attaching ink droplets on a medium like in an ink-jet system, although a micro phenomenon between the ink and medium occurs, an interference between dots hardly occurs and dots can be surely recorded.

A print image by an electrophotographic printing apparatus is largely influenced by variations of a spatial frequency due to the non-linear characteristic of the electrophotography process. Upon forming a halftone image by the electrophotography process, a halftone dot method is used in consideration of the non-linear characteristic. When the halftone dot method is used, a fundamental spatial frequency is fixed, and dots can be stably recorded without being influenced by variations of the spatial frequency. For example, assuming that the screen ruling of halftone dots is N lines/inch, a pitch P of halftone dots is 25.4/N mm. That is, the spatial frequency is $1/(2P)=N/(2\times25.4)$, and the fundamental spatial frequency is fixed. Therefore, when a printing apparatus is designed to always stabilize the electrophotography process at the fundamental spatial frequency, a print image can be stably formed. For example, in a printing apparatus of 1200 dpi, the fundamental frequency of a halftone dot screen of 200 lines/inch is 4 cycles/mm. That is, by stabilizing the electrophotography process at the spatial frequency of 4 cycles/mm, the image reproduction characteristic of the printing apparatus can be improved.

An AM modulation method based on the halftone dot method can obtain a stable image reproduction characteristic. At the same time, moiré is readily generated since C, M, Y, and K color tones are superposed in color printing. In order to suppress moiré, screen angles are changed for respective color components to drive moiré beats generated among color components toward the high frequency side, thus visually obscuring moiré. For example, moiré due to superposition of color toners is suppressed by setting the Y screen angle to be 30°, and the C, M, and K screen angles to be 0° or 60°.

In digital halftone processing, since the resolution of a digital image is discrete, arbitrary screen angles cannot be set. However, if optimal and discrete screen angles are selected for respective color components, moiré can be suppressed.

However, even when the technique that changes the screen angles is introduced, moiré beats are merely driven to the high frequency side, and a unique pattern formed due to superposition of color components remains. This is a so-called Rosetta pattern, which disturbs upon outputting a high-image quality image. Particularly, upon outputting a photo image with high image quality, smooth image quality reproduction is demanded like a photo obtained by the silver halide process, and the Rosetta pattern becomes a serious disturbance.

As another approach, a method of attaining tone reproduction by an FM modulation method based on error diffusion or blue noise masking is available. The FM modulation method is popularly adopted in an ink-jet system, thermal transfer system, and the like, since it generates a random layout of print dots, has high tonality, and is free from any moiré due to superposition of color components. However, in the FM modulation method, the dot interval changes, and cannot be freely controlled. For example, as the density value becomes higher, the dot interval is gradually reduced. For this reason, the spatial frequency characteristic changes to the high frequency side, and is directly influenced by the frequency characteristic of a printing apparatus. Therefore, the FM modulation method is not suited to an electrophotographic printing apparatus, which is readily influenced by spatial frequency variations.

As a method of solving the aforementioned problems, a hybrid halftone method attracts attention. This method is an intermediate method of the AM and FM modulation methods, and has features of both the methods. The hybrid halftone method clusters dots to vary dot intervals. Since the dot interval variations are irregular and anisotropic, the spatial correlation among dots lowers, thus suppressing generation of moiré.

The hybrid halftone method deprives periodicity by clustering dots and moving lattice points (the central positions of halftone dots) using a random number and rotation manipulation, thereby suppressing generation of moiré. Various methods of generating a hybrid halftone screen have been proposed. These methods have an advantage (print stability) of the AM modulation method and those (moiré dissolution, high resolution) of the FM modulation method, and an image output with high screen ruling and high image quality is expected.

However, the hybrid halftone method targets a printer of a high resolution (e.g., 2400 dpi), and is premised on formation of one halftone dot at a high resolution. On the other hand, an office-use electrophotographic printer has a resolution as low as 600 dpi, and it is difficult to achieve both high halftone dot screen ruling and a sufficient tone characteristic. Furthermore, heterogeneity in pitch of an engine that scans a light beam, banding noise due to mechanical vibrations, and the like cause considerable deterioration of image quality. Hence, in order to apply the hybrid halftone method to an office-use printer, special attention is needed.

Upon applying the hybrid halftone method to an electrophotographic printing apparatus, low and middle density ranges exhibit relatively good tone characteristics. However, in a high density range, halftone dots grow to reduce the areas of blank regions among halftone dots, and blank regions each having a width of one to two pixels are formed. For this reason, the blank regions become crushable and unstable owing to the temperature, mechanical vibrations, electrophotography process variations, and the like, and image quality considerably deteriorates due to the aforementioned heterogeneity in pitch and banding noise.

As a method of avoiding the blank regions from crushing, a method of introducing white dots is known. In the AM modulation method, black and white dots are laid out in a checkerboard pattern to blacken white dots from outside (to grow black dots) to have an intermediate density as a boundary. That is, black and white dots grow to be symmetrical about a density axis, so as to stabilize white dots. However, since white dots are laid out in a checkerboard pattern, the screen ruling of halftone dots is reduced to about $\sqrt{(1/2)} \approx 0.7$ compared to a case without introducing any white dots (all black dots).

When a printer of 600 dpi is used to form a halftone dot screen of 175 lines on average, about 12 pixels are used for a halftone dot that forms one threshold matrix using the threshold matrix of 3.4×3.4 pixels on average in a state without introducing any white dots. However, when white dots are introduced, a threshold matrix is defined by about 2.4×2.4 pixels, and only about six pixels are used for a halftone dot that forms one threshold matrix. That is, it becomes difficult to form a desired halftone dot screen, that is, it is difficult to introduce white dots to an office-use printer with a low resolution. In other words, stable tone reproduction with high screen running and high image quality is demanded for a low-resolution printer without introducing any white dots.

SUMMARY OF THE INVENTION

In one aspect, an image processing apparatus comprising: an inputting section, arranged to input minimum and maximum halftone dot sizes, and a cluster size; a determiner, arranged to determine a start pixel of expansion of a halftone dot; a first calculator, arranged to calculate a centroid of the halftone dot; a second calculator, arranged to calculate the number of blackened pixels of pixels included in the halftone dot when a size of the halftone dot reaches the minimum halftone dot size; an expander, arranged to expand the halftone dot by adding a pixel adjacent to the centroid of the halftone dot to the halftone dot when the size of the halftone dot is smaller than the minimum halftone dot size or when the number of blackened pixels does not reach the cluster size and the size of the halftone dot is smaller than the maximum halftone dot size; a partition section, arranged to Voronoi-partition a halftone screen into polygons to have the centroids of the halftone dots as kernel points when the number of blackened pixels becomes not less than the cluster size or when the size of the halftone dot reaches the maximum halftone dot size; and a growing section, arranged to grow halftone dots in shapes associated with the polygons by blackening pixels equal in number of blackened pixels included in the polygons to have centroids of the polygons as centers of growth.

According to the aspect, a halftone screen applicable to an electrophotographic printer can be created. Also, a halftone screen, which can suppress generation of moiré and can obtain satisfactory tone reproduction, can be created.

Further features of the present invention will become apparent from the following description of exemplary embodiments with reference to the attached drawings.

BRIEF DESCRIPTION OF THE DRAWINGS

FIG. 7 is a view showing halftone dots obtained upon creation of a CHS, and centroids of the halftone dots;

FIG. 8 is a view showing a table used to search for an addition pixel;

FIGS. 10A and 10B are views for explaining the relationship between the tone densities of image data and the centroids of halftone dots;

FIG. 11 is a view showing the halftone-dot shapes and centroids in a rectangular region shown in FIG. 10B;

FIGS. 12A and 12B are views for explaining the relationship between the tone densities of image data and the centroids of halftone dots when the minimum halftone dot size is not fluctuated;

FIG. 13 is a flowchart for explaining Voronoi partition in the CHS generation processing;

FIGS. 14A to 14C are views for explaining generation of Voronoi polygons;

FIGS. 15 and 16 are views showing the centroids of the Voronoi polygons obtained by the Voronoi partition;

FIG. 20 is a view showing Voronoi polygons obtained from the centroids with respect to a gradation image shown in FIG. 10A, and the centroids;

FIGS. 21A and 21B are views showing halftone dot image examples finally formed by the CHS;

FIGS. 25A to 25D are views showing changes of halftone dots when the CHS creation parameters are changed;

FIG. 26 is a view for explaining expansion of halftone dots in the second embodiment;

FIG. 27 is a view showing a table used to search for an addition pixel;

FIG. 28 is a view for explaining formation of a halftone polygon;

FIG. 29 is a view showing formation of a halftone polygon when a Voronoi polygon includes shorter sides; and FIGS. 30A and 30B are views showing shapes of halftone polygons nearly similar to midpoint polygons.

DESCRIPTION OF THE EMBODIMENTS

Image processing according to embodiments of the present invention will be described in detail hereinafter with reference to the accompanying drawings.

First Embodiment

[Apparatus Arrangement]

Figure 1:
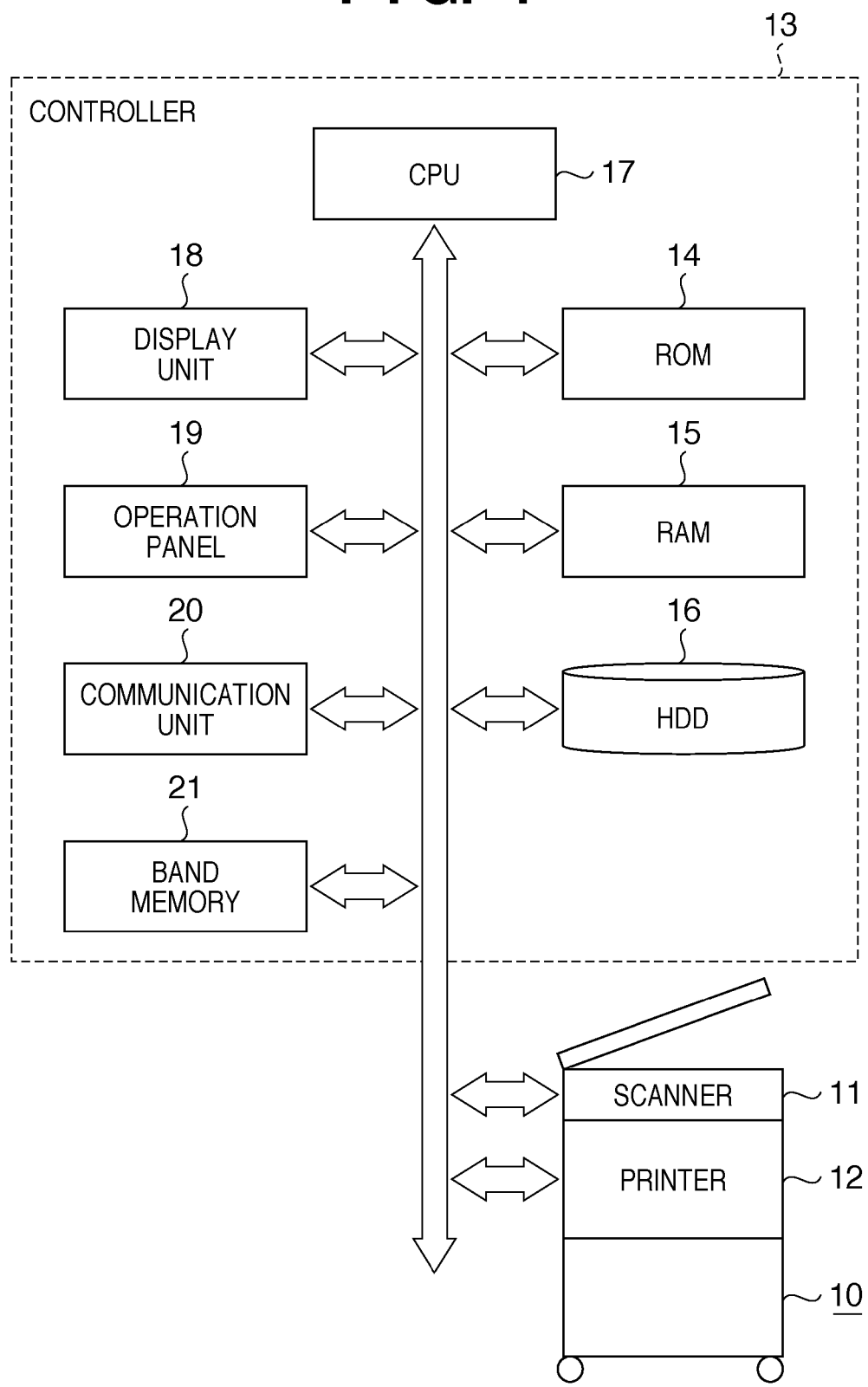
FIG. 1 is a block diagram showing the arrangement of an image processing apparatus according to an embodiment.

FIG. 1 is a block diagram showing the arrangement of an image processing apparatus according to an embodiment.

Functions of a multi-functional peripheral equipment (MFP) 10, which has a scanner 11 and an electrophotographic printer 12, are controlled by a controller 13 incorporated in the MFP 10.

A microcontroller (CPU) 17 of the controller 13 executes an operating system (OS) and various programs stored in a read only memory (ROM) 14 and hard disk drive (HDD) 16 using a random access memory (RAM) 15 as a work memory. The HDD 16 stores programs such as a control program, image processing program, and the like, and image data. An image memory 21 is a rendering page memory. Note that the image memory 21 may be allocated on the RAM 15 or may be provided independently of the RAM 15.

The CPU 17 displays a user interface on a display unit 18 and inputs user's instructions from software keys on the display unit 18 and a keyboard of an operation panel 19. For example, when a user's instruction indicates a copy instruction, the CPU 17 controls the printer 12 to print a document image scanned by the scanner 11 (copy function).

A communication unit 20 is a communication interface which is connected to a public line and computer network (although not shown). When a user's instruction indicates a facsimile sending instruction, the CPU 17 controls the communication unit 20 to send a document image scanned by the scanner 11 to a communication partner designated by the user as a facsimile image (facsimile function). When a user's instruction indicates a push scan instruction, the CPU 17 controls the communication unit 20 to send a document image scanned by the scanner 11 to a designated server (push scan function). When the communication unit 20 receives a facsimile image, the CPU 17 controls the printer 12 to print the received image (facsimile function). When the communication unit 20 receives a print job, the CPU 17 controls the printer 12 to print an image in accordance with the print job (printer function). When the communication unit 20 receives a pull scan job, the CPU 17 sends a document image scanned by the scanner 11 to a designated server or client in accordance with the scan job (pull scan function).

Arrangement of Optical System

Figure 2:
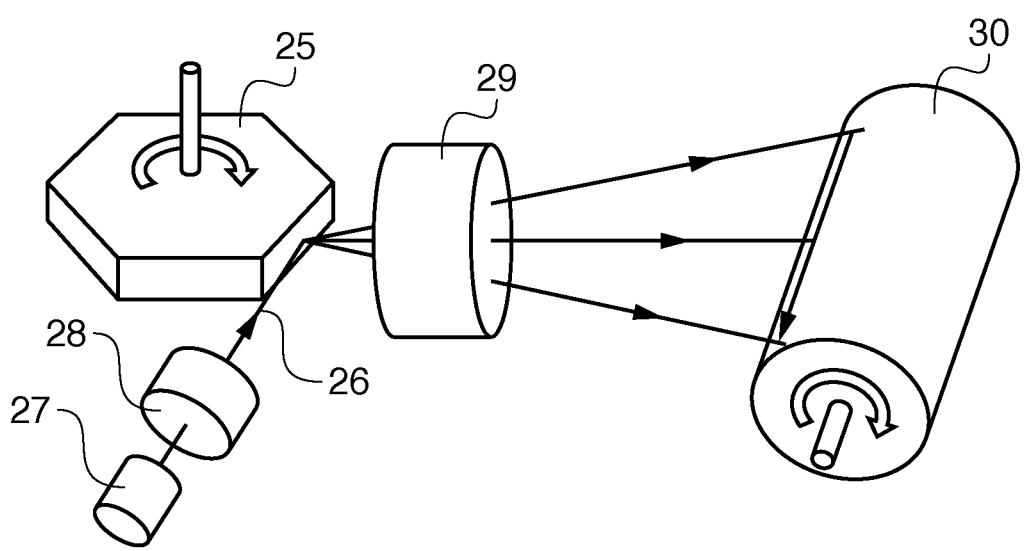
FIG. 2 is a view showing the arrangement of an optical system of a printer.

FIG. 2 is a view showing the arrangement of an optical system of the printer 12.

A light beam 26 emitted by a light source 27 such as a semiconductor laser element or the like enters a reflecting surface of a rotary polygonal mirror 25 via a collimator lens 28 based on a spherical system or anamorphic optical system. The light beam 26 deflected by rotation of the rotary polygonal mirror 25 is imaged on a rotating photosensitive drum 30 via an imaging lens 29 such as an f-θ lens or the like, thus optically scanning the surface of the photosensitive drum 30.

Dot Generator

Figure 3:
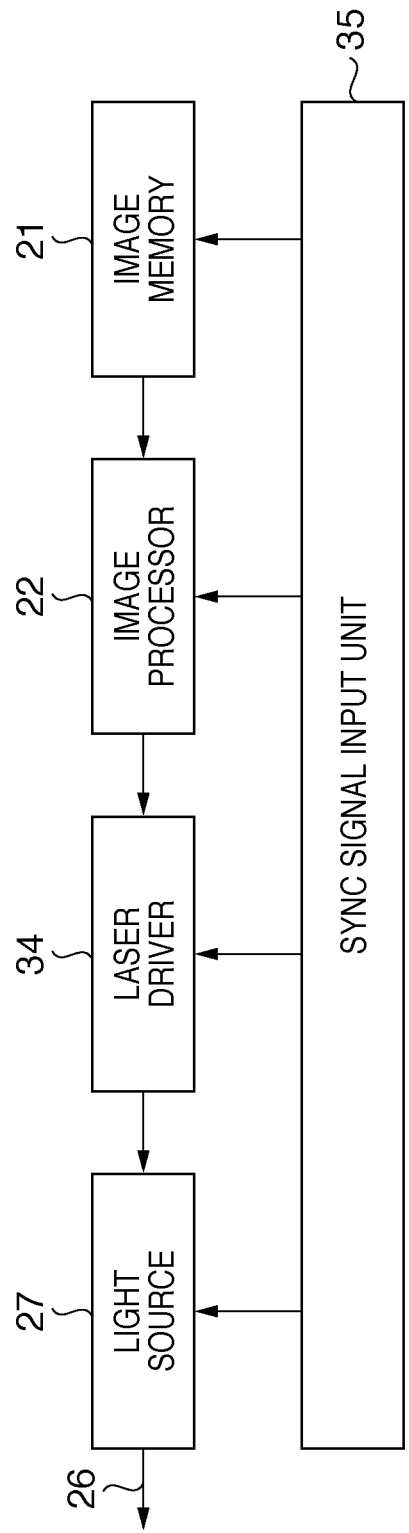
FIG. 3 is a block diagram showing the arrangement of a dot generator which generates a halftone screen.

FIG. 3 is a block diagram showing the arrangement of a dot generator which generates a halftone screen. Note that the dot generator is configured as a part of the controller 13. In the following description, the halftone screen of this embodiment will be referred to as a cluster-halftone screen (CHS).

A sync signal input unit 35 inputs, as synchronizing signals, a horizontal synchronizing signal Hsync indicating the scan timing of one line, vertical synchronizing signal Vsync indicating the scan timing of one page, and pixel clocks Vclock from the printer 12. These synchronizing signals are supplied to the image memory 21, an image processor 22, a laser driver 34, and the light source 27, so as to control image formation timings.

The image processor 22 receives an image from the image memory 21, and executes halftone processing using a CHS (to be described later). The laser driver 34 drives the light source 27 in accordance with a binary signal output from the image processor 22, thus controlling light emission of the light source 27.

[Creation of CHS]

CHS generation processing can be roughly divided into the following steps.

First step: The centroids of halftone dots and the number of pixels to be blackened (to be referred to as the number of blackened pixels hereinafter) are calculated (determination of centroids and the number of blackened pixels).

Second step: A screen is Voronoi-partitioned to have the centroids of the halftone dots as kernel points, thereby calculating Voronoi polygons (Voronoi partition).

Third step: Pixels equal in number of blackened pixels are blackened to have the centroids of the Voronoi polygons as the centers of growth (growing of halftone dots).

Determination of Centroids and Number of Blackened Pixels

Figure 4:
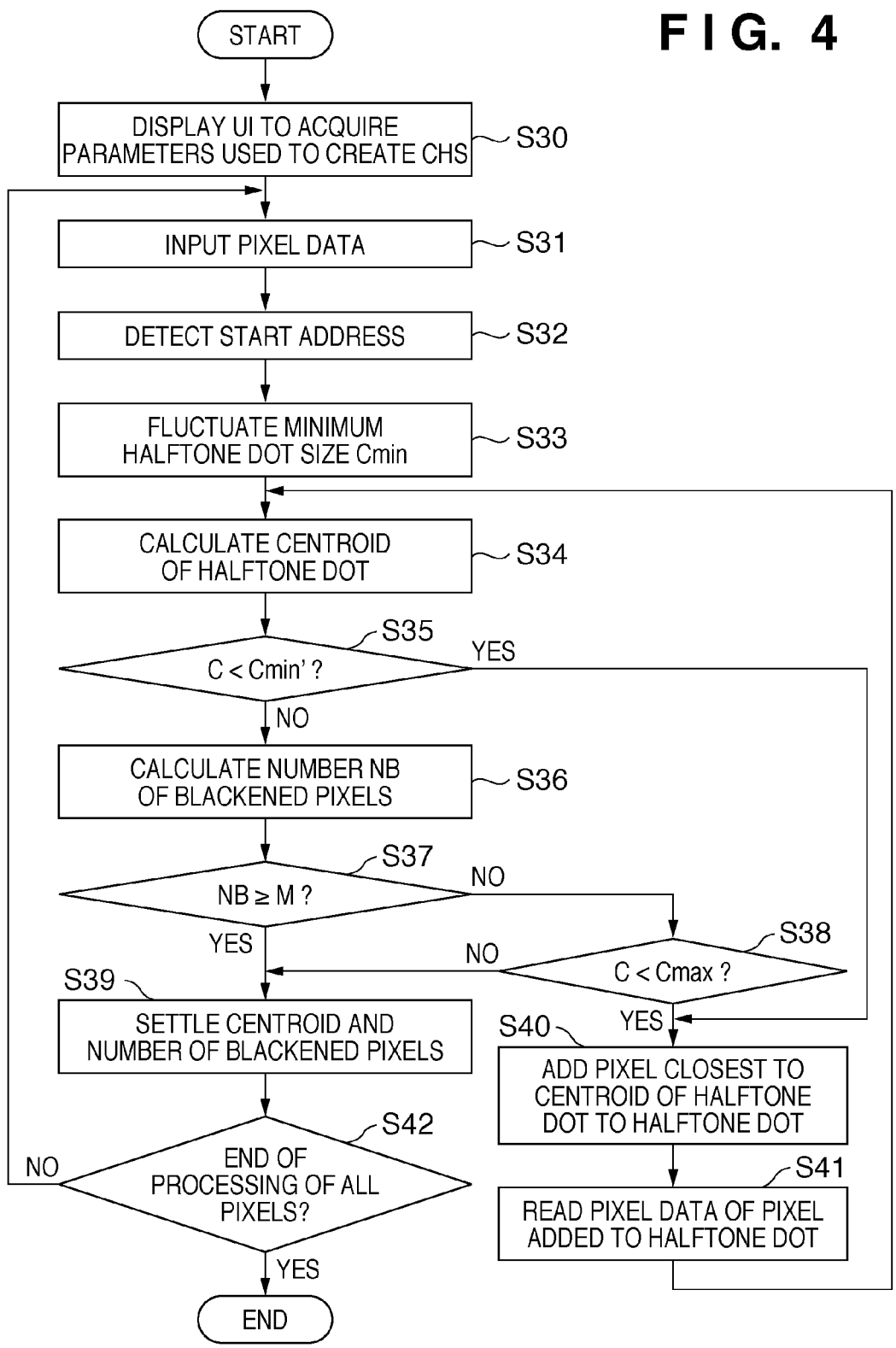
FIG. 4 is a flowchart for explaining determination of centroids and the number of blackened pixels in CHS generation processing.

FIG. 4 is a flowchart for explaining determination of the centroids and the number of blackened pixels in the CHS generation processing. The image processor 22 executes this processing.

Figure 5:
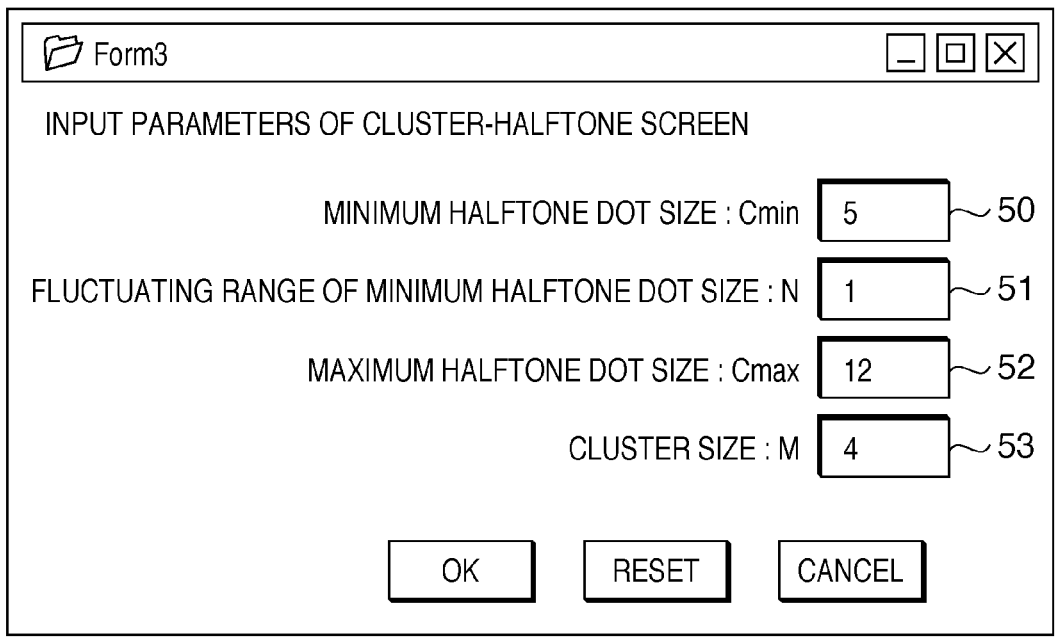
FIG. 5 is a view showing a UI example used to input creation parameters of a CHS.

The image processor 22 displays a user interface (UI) shown in FIG. 5 on the display unit 18 to acquire creation parameters used to create a CHS (S30). In this embodiment, tones are expressed by growing (blackening) areas of halftone dots in correspondence with the tone densities of image data. A size of a halftone dot will be referred to as a halftone dot size, and a minimum dot (e.g., a minimum dot size that the printer 12 can form) in a halftone dot will be referred to as a cell. The user sets numerical values in text boxes 50 to 53 of a minimum halftone dot size Cmin, a fluctuating range N of the minimum halftone dot size, a maximum halftone dot size Cmax, and a cluster size M by operating the UI in FIG. 5, and then presses an OK button.

The minimum halftone dot size Cmin and maximum halftone dot size Cmax regulate the halftone dot size, and represent a size in a one-dimensional direction of blackening of a halftone dot. The fluctuating range N of the minimum halftone dot size is a numerical value that determines the magnitude of a fluctuation to be given to the halftone dot size. The cluster size M represents the number of blackened cells to be clustered upon expressing a middle tone density in tone expression. The image processor 22 acquires these four parameters, and starts generation of a CHS.

Next, the image processor 22 inputs upper left pixel data of the image (S31). If pixel data is given by the following expression, the image processor 22 inputs data Image (1, 1).

$$\text{Image}(x, y) \tag{1}$$

for $1 \leq x \leq X\text{size}$ and $1 \leq y \leq Y\text{size}$ where Xsize is the number of pixels in the main scan direction (X-direction) of an image, and Ysize is the number of pixels in the sub-scan direction (Y-direction) of the image.

If the pixel data is defined by RGB values, the image processor 22 converts pixel data Image(x, y) into tone density values YMC using one set of:

$$Y = 1 - B$$

$$M = 1 - G \tag{2}$$

$$C = 1 - R$$

$$Y = \log_{10}(1/B)$$

$$M = \log_{10}(1/G) \tag{2'}$$

$$C = \log_{10}(1/R)$$

Let D be a tone density value of an arbitrary color component. Note that the process in step S41 (to be described later) similarly converts luminance values into tone density values.

The image processor 22 detects a start address of processing (S32). That is, the image processor 22 refers to a bitmap (1-bit depth) table corresponding to the size of an image to be printed in a raster order, and sets a pixel position with a first '0' value as a start address. The bitmap table has values given by:

In case of processed pixel, PixData='1'

In case of unprocessed pixel, PixData='0'  (3)

for $1 \leq x \leq X\text{size}$ and $1 \leq y \leq Y\text{size}$

Respective pixel values are initialized to '0' at the beginning of the processing. Therefore, immediately after Image(1, 1) is input, PixData(1, 1) is set as a start address. '1' is set in PixData(x, y) corresponding to the detected start address.

Figure 6:
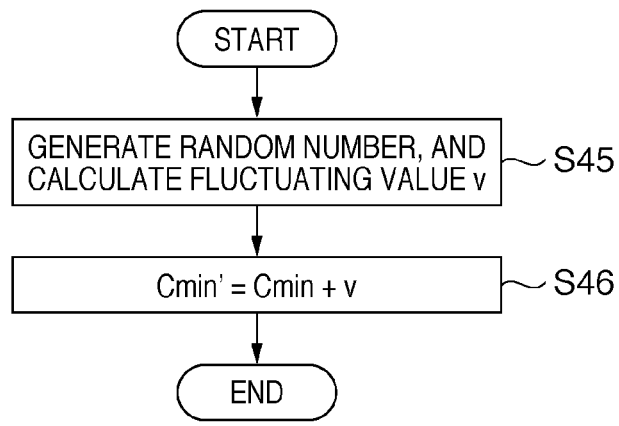
FIG. 6 is a flowchart showing processing for fluctuating a minimum halftone dot size.

The image processor 22 fluctuates the minimum halftone dot size Cmin (S33). FIG. 6 is a flowchart showing processing for fluctuating the minimum halftone dot size Cmin. The image processor 22 generates a random number, and calculates a fluctuating value v to be added to the minimum halftone dot size according to the fluctuating range N of the minimum halftone dot size (S45) by:

$$v = \text{int}\{N \cdot \text{rand}() + 0.5\} \quad (4)$$

where N is a natural number, rand( ) is a function of generating a random number ranging from 0<r<1, and int( ) is a function of truncating a fractional part.

According to equation (4), one of 0, 1, 2, . . . , N is obtained as the fluctuating value v. When the fluctuating range N=1 of the minimum halftone dot size, v=0 or v=1. The image processor 22 fluctuates the minimum halftone dot size Cmin (S46) by:

$$\text{Cmin}' = \text{Cmin} + v \quad (5)$$

The image processor 22 calculates a centroid of a halftone dot (S34). Note that (1, 1) indicates the centroid immediately after Image(1, 1) is input. The image processor 22 checks if the halftone dot size C is less than the minimum halftone dot size Cmin' (S35). If C<Cmin', the image processor 22 expands the halftone dot. That is, the image processor 22 adds a pixel (adjacent pixel) which is closest to the centroid of the halftone dot and has PixData(x, y)='0' to the halftone dot (S40), and reads pixel data of the pixel added to the halftone dot (S41). After that, the process returns to the calculation of the centroid (S34). Note that '1' is set in PixData(x, y) corresponding to the pixel added to the halftone dot.

The image processor 22 repeats the processes in steps S32 to S41 until C=Cmin'. Note that the image processor 22 expands the halftone dot until C=Cmin' in both the X- and Y-directions.

An accumulated tone density value SumD (a total tone density value) of the halftone dot after the expansion processing is given by:

$$\text{SumD} = \Sigma D_i \quad (6)$$

where $D_i$ is a tone density value D of the i-th pixel added to the halftone dot.

The image processor 22 calculates the centroid of the halftone dot after expansion (S34) by:

$$Gx' = (xa - Gx) \cdot Da/(\text{SumD0} + Da) + Gx$$

$$Gy' = (ya - Gy) \cdot Da/(\text{SumD0} + Da) + Gy \quad (7)$$

where (Gx', Gy') is the centroidal position of the halftone dot after expansion, (Gx, Gy) is the centroidal position of the halftone dot before expansion, SumD0 is an accumulated tone density value of the halftone dot before expansion, (xa, ya) is the position of an addition pixel, and Da is the tone density value of the addition pixel.

Note that the centroid is located at a position near a high-tone density pixel included in the halftone dot.

If the halftone dot size C reaches the minimum halftone dot size Cmin', the image processor 22 calculates the number NB of blackened pixels (S36) by:

$$NB = \text{SumD}/(D\text{max} \times P) \times P = \text{SumD}/D\text{max} \quad (8)$$

where P is the number of pixels added to the halftone dot, and

Dmax is a maximum tone density value (e.g., 255) per pixel.

When a pixel size is equal to a cell size, the number of tones that can be expressed by one halftone dot is proportional to the number P of pixels added to the halftone dot. On the other hand, the maximum value of the accumulated tone density value SumD of the halftone dot is given by Dmax×P from the maximum tone density value Dmax per pixel. Therefore, the number NB of blackened pixels in a certain halftone dot assumes a value obtained by multiplying a ratio SumD/(Dmax×P) of the accumulated tone density value and the maximum value of the accumulated tone density value by the number P of pixels.

The image processor 22 compares the number NB of blackened pixels with the cluster size M (S37). If the number of blackened pixels is equal to or larger than the cluster size (NB≧M), the image processor 22 determines the centroid and the number of blackened pixels of that halftone dot (i.e., it settles the halftone dot) (S39). On the other hand, if NB<M, the image processor 22 compares the halftone dot size C with the maximum halftone dot size Cmax (S38). If C=Cmax, the image processor 22 settles the halftone dot (S39). If C<Cmax, the process returns to step S40 to further expand the halftone dot. Note that the process returns to step S40 until C=Cmax is determined in step S38 in both the X- and Y-directions.

If the process returns to step S40, the image processor 22 adds a pixel which is closest to the centroid of the halftone dot and has PixData(x, y)='0' to the halftone dot (S40), and reads pixel data of the pixel added to the halftone dot (S41). The process then returns to the centroid calculation of the halftone dot (S34). After that, since C>Cmin' has already been met, the process advances to the calculation of the number NB of blackened pixels (S36) and comparison between the number NB of blackened pixels and cluster size M (S37).

After NB≧M or C=Cmax, the image processor 22 checks if processing of all pixels is complete (S42), after the halftone dot is settled (S39). If pixels to be processed still remain, the process returns to step S31. If there is no pixel with a value '0' in the bitmap table, it can be determined that processing of all pixels is complete.

FIG. 7 is a view showing halftone dots 41 obtained upon creation of the CHS, and centroids 40 of the halftone dots. When each halftone dot 41 is expanded by adding a pixel closest to the centroid to that halftone dot, the halftone dot 41 as a result of expansion has a shape approximate to a circle.

When a cell is expanded by selecting a pixel close to the centroid, a distance s between the centroids and halftone dot is given by:

$$s = \sqrt{\{(Gx - x)^2 + (Gy - y)^2\}} \quad (9)$$

where (Gx, Gy) is the centroid, and (x, y) is the coordinate value of a pixel.

That is, the image processor 22 selects a pixel having a minimum distance s (a pixel of PixData='0'; to be referred to as an addition pixel hereinafter) in step S40.

FIG. 8 is a view showing a table used to search for an addition pixel.

In the table shown in FIG. 8, an upper column records numerical values indicating a search order, and a lower column records 2-digit numerical values indicating displacement amounts from the centroid of the halftone dot. That is, assuming that a pixel (displacement amount=00) with a search order "1" is a centroid (Xg, Yg) of the halftone dot, a candidate of an addition pixel is a pixel (displacement amount=10) with a search order "2". Therefore, the address of the next pixel is (Xg+1, Yg+0). For PixData of the pixel with the search order "2", that is, PixData(Xg+1, Yg+0)='0', the pixel with the search order "2" is selected as an addition pixel. If PixData(Xg+1, Yg+0)='1', the pixel with the search order "2" is skipped, and a pixel with a search order "3" is checked.

Using such table, a candidate of an addition pixel closest to the centroid of the halftone dot can be quickly searched.

Figure 9:
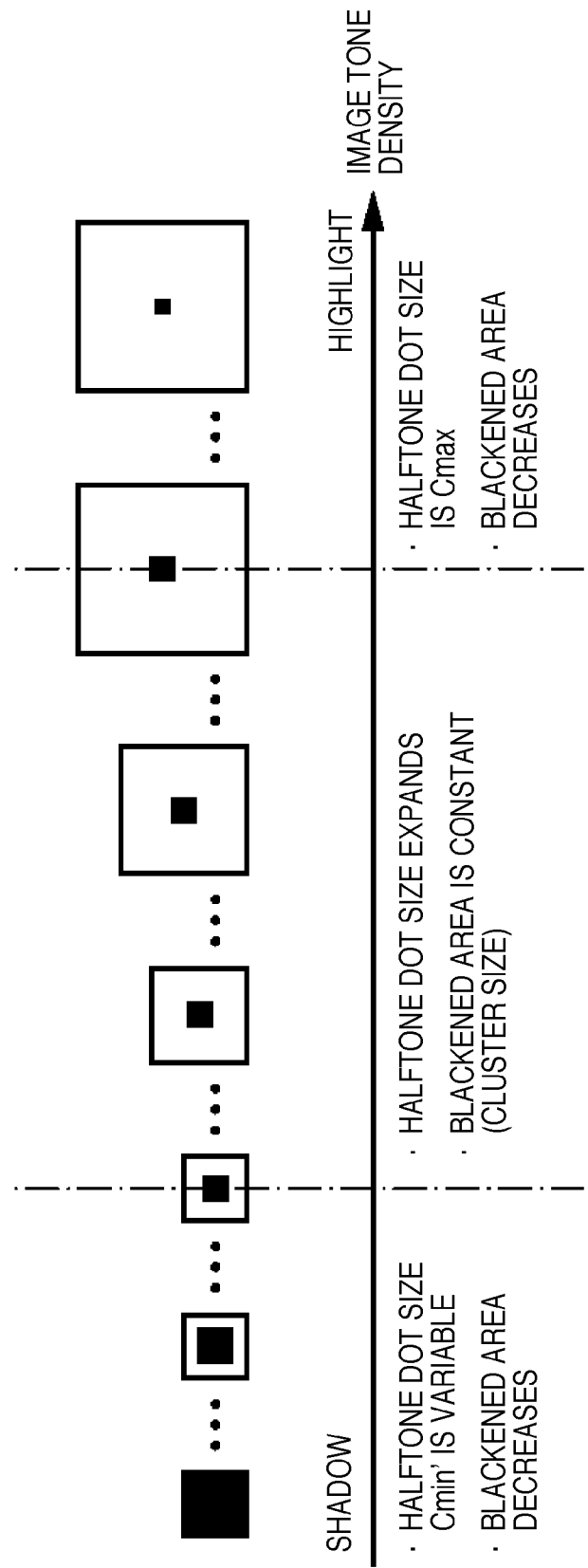
FIG. 9 is a view conceptually showing halftone dot sizes obtained upon creation of the CHS.

FIG. 9 is a view conceptually showing halftone dot sizes obtained upon creation of the CHS. An actual halftone-dot shape is a shape formed by lacking a part of a circle, as shown in FIG. 7, but FIG. 9 illustrates a halftone dot size as a square pattern.

In a shadow range of image data, as the tone density becomes lower (toward highlight), the number NB of blackened pixels (blackened area) decreases in a halftone dot with the minimum halftone dot size Cmin'. In a middle tone density range of image data, as the tone density becomes lower, the blackened area is constant (cluster size M), and the halftone dot size C is expanded. In a highlight range of image data, as the tone density becomes lower, the blackened area decreases in a halftone dot with the maximum halftone dot size Cmax.

FIGS. 10A and 10B are views for explaining the relationship between the tone densities of image data and the centroids of halftone dots. Since the halftone dot size is fixed to Cmin' in a shadow range, as shown in FIG. 10B, with respect to gradation image data shown in FIG. 10A, the centroids are arranged at nearly equal intervals except for fluctuation components. In a middle tone density range, since the halftone dot size is expanded, the interval between adjacent centroids gradually increases. In a highlight range, since the halftone dot size is fixed to Cmax, the centroids are arranged at nearly equal intervals.

FIG. 11 is a view showing the halftone-dot shapes and centroids in a rectangular region 54 shown in FIG. 10B. As can be seen from FIG. 11, the halftone dot sizes in a middle tone density range become larger toward a highlight range.

FIGS. 12A and 12B are views for explaining the relationship between the tone densities of image data and the centroids of halftone dots when the minimum halftone dot size Cmin is not fluctuated. With respect to the same gradation image data shown in FIG. 12A as in FIG. 10A, changes in interval of halftone dots are nearly the same as those in FIG. 10B, but periodic patterns are generated at the positions of centroids, as shown in FIG. 12B, and a layout of halftone dots is not sufficiently random. By adding the aforementioned fluctuations, a periodic layout of halftone dots disappears, as shown in FIG. 10B, and a halftone dot pattern free from any moiré can be generated.

Voronoi Partition

FIG. 13 is a flowchart for explaining Voronoi partition in the CHS generation processing. The image processor 22 executes this processing.

The image processor 22 inputs the positions of the determined centroids (S60), and generates Voronoi polygons by Voronoi-partitioning a screen to have the centroids as kernel points (S61).

FIGS. 14A to 14C are views for explaining generation of Voronoi polygons. FIG. 14A shows the centroids serving as kernel points, FIG. 14B shows Delaunay triangles 71 formed by coupling the kernel points, and FIG. 14C shows the kernel points and Voronoi polygons.

A Voronoi polygon with respect to a kernel point Pi is a set of points V(Pi) given by:

$$V(Pi)=\{P|d(P, Pi)<d(P, Pj), \forall j \neq i\} \quad (10)$$

where Pj is a kernel point adjacent to Pi,
d(P, Pi) is the distance between a kernel point P and the kernel point Pi, and
d(P, Pj) is the distance between the kernel points P and Pj. The Voronoi polygon represents an influential zone of the kernel point Pi.

Each side (Voronoi boundary) of the Voronoi polygon is a line segment that couples the circumcenters of Delaunay triangles. The Delaunay triangle has, as sides, line segments that couple adjacent kernel points, and is uniquely determined with respect to the kernel point. Therefore, the Voronoi polygon is also uniquely determined. The circumcenter (Gx, Gy) of the Delaunay triangle is expressed by:

$$Gx=\{X0^2(Y1-Y2)+X1^2(Y2-Y0)+X2^2(Y0-Y1)-(Y0-Y1)(Y1-Y2)(Y2-Y0)\}/L$$

$$Gy=-Gx(X2-X1)/(Y2-Y1)+(X2-X1)(X1+X2)/2/(Y2-Y1)+(Y1+Y2)/2 \quad (11)$$

for $L=2\{X0(Y1-Y2)+X1(Y2-Y0)+X2(Y0-Y1)\}$
where (X0,Y0), (X1,Y1), and (X2,Y2) are the coordinates of vertices of the Delaunay triangle.

In this way, a Voronoi polygon including one kernel point is formed, and that Voronoi polygon is used to define a halftone-dot shape of the corresponding halftone dot. FIG. 14C is a view showing Voronoi polygons (halftone-dot shapes), and these Voronoi polygons serve as growing regions of halftone dots. The Voronoi polygons determine visually smooth halftone-dot shapes with respect to lattice points which are randomly laid out. If the setting of halftone-dot densities according to the tone densities of an image (density modulation) is to be executed using a square dot lattice by varying a halftone dot area, the interior of each halftone dot cannot be filled up well (to grow a black dot). When Voronoi polygons are used, the interior of each halftone dot can be filled up visually naturally.

FIGS. 15 and 16 are views showing the centroids of Voronoi polygons obtained by the Voronoi partition. The dispersiveness of a layout of the centroids shown in FIG. 15 is relatively good. On the other hand, the dispersiveness of a layout of the centroids is not so good. When the layout of the centroids with insufficient dispersiveness shown in FIG. 16 is obtained, it is desired to disperse the layout of the centroids using a centroidal Voronoi diagram.

The centroidal Voronoi diagram is obtained by processing called centroidal Voronoi tessellation (CVT) which moves kernel points to the centroids of Voronoi polygons, and applies Voronoi partition again. Repetition of this processing is called a Lloyd algorithm, and details are described in S. Lloyd "Least Square Quantization in PCM" IEEE Trans. Inform. Theory, Vol. 28, pp. 129-137, 1982.

Upon execution of the CVT to have the centroids shown in FIG. 16, as kernel points, the centroids after the CVT have a well-dispersed state shown in FIG. 15. That is, in step S61 in FIG. 13, the CVT may be executed. However, in case of the method of expanding a halftone dot to have a pixel closest to the centroid as a pixel candidate of halftone dot expansion, as shown in FIG. 7, the centroids move a little, and sufficiently dispersed centroids can be obtained without execution of the CVT.

Growing of Halftone Dots

Figure 17:
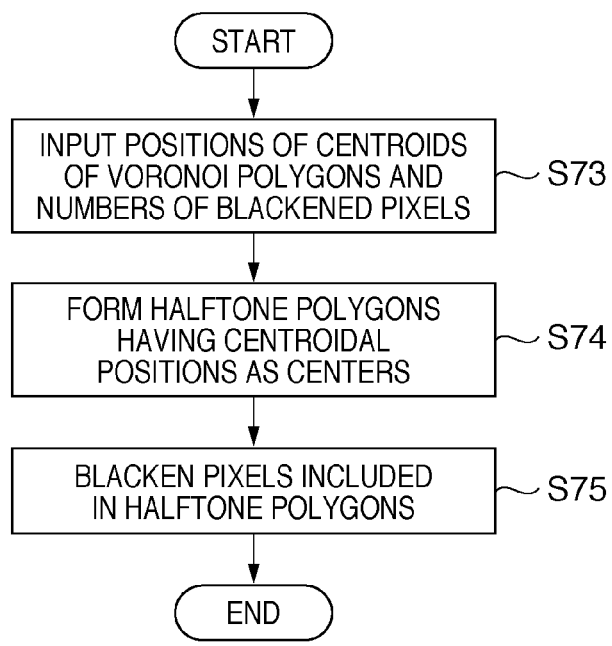
FIG. 17 is a flowchart for explaining growing of halftone dots in the CHS generation processing.

FIG. 17 is a flowchart for explaining growing of halftone dots in the CHS generation processing. The image processor 22 executes this processing.

The image processor 22 inputs the positions of the centroids of the Voronoi polygons and the number NB of blackened pixels (S73), and forms halftone polygons, each of which includes pixels equal in number NB of blackened pixels and is associated with (in this case, nearly similar to) the Voronoi polygon, to have the centroids as the centers of growth (S74). The pixels in the halftone polygons are blackened (filled in black) (S75).

Figure 18:
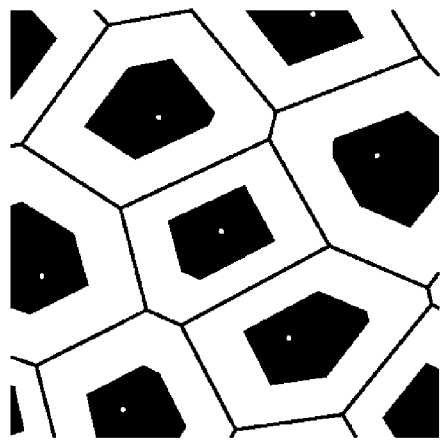
FIGS. 18 and 19 are views showing a state in which halftone dots are expanded.
Figure 19:
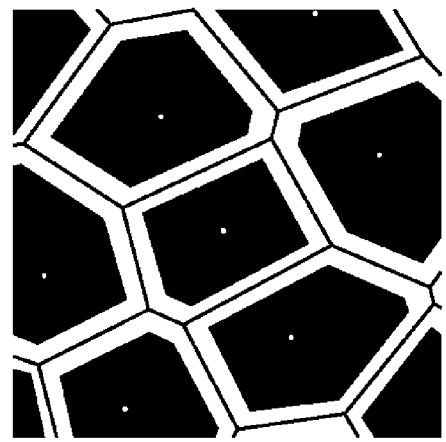

FIGS. 18 and 19 are views showing a state in which halftone dots are expanded. FIG. 18 shows halftone dots when tone values=30%, and FIG. 19 shows those when tone values=75%.

Using the number NB of blackened pixels and an area S of a Voronoi polygon expressed by the number of pixels, an area ratio η of pixels to be blackened is given by:

$$\eta = NB/S \quad (12)$$

That is, a halftone polygon is set by reducing a Voronoi polygon to a similar shape at a ratio of $\sqrt{\eta}$, and pixels included in the halftone polygon are blackened.

FIG. 20 is a view showing the Voronoi polygons obtained from the centroids with respect to the gradation image shown in FIG. 10A, and the centroids. FIGS. 21A and 21B are views showing halftone dot image examples finally formed by the CHS. FIG. 21A shows a halftone dot image corresponding to a gradation image which expresses values ranging from 128 to 255 of 8-bit luminance data, and FIG. 21B shows a halftone dot image corresponding to a gradation image which expresses values ranging from 0 to 255 of 8-bit luminance data.

Figures 22, 23, 24:
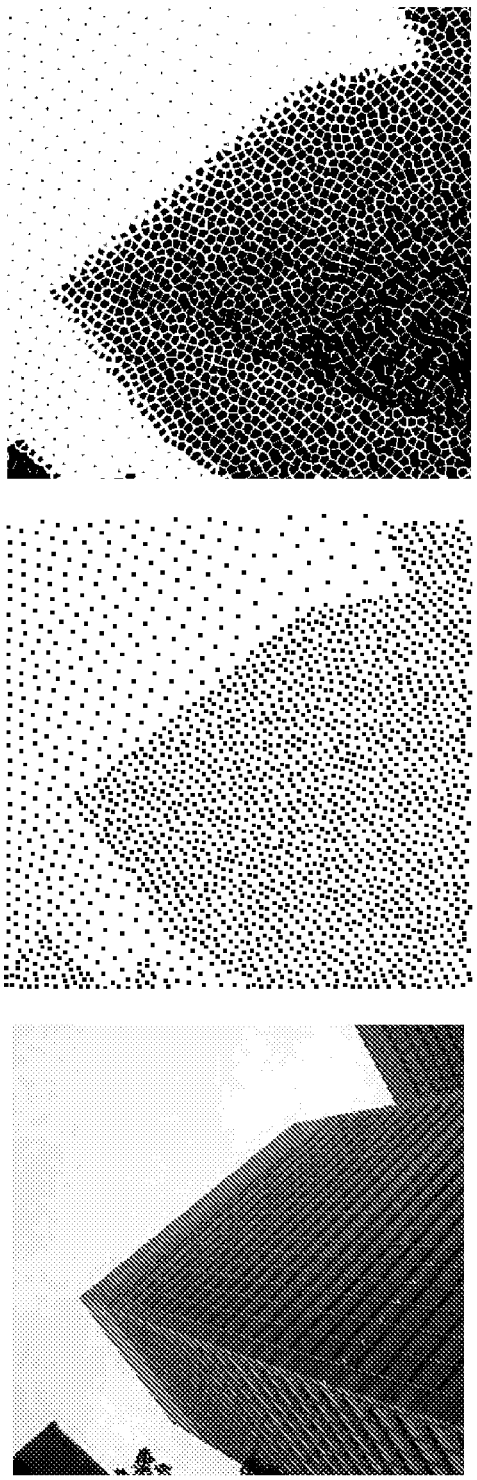
FIG. 22 is a view showing an input image (a photograph of a building)
FIG. 23 is a view showing centroids obtained by the processing for determining the centroids and the number of blackened pixels with respect to the image shown in FIG. 22.
FIG. 24 is a view showing a halftone dot image which is obtained by growing halftone dots and uses the CHS.

FIG. 22 is a view showing an input image (a photograph of a building), FIG. 23 is a view showing centroids obtained by the determination processing of the centroids and the number of blackened pixels (first step) with respect to the image shown in FIG. 22, and FIG. 24 is a view showing a halftone dot image using the CHS obtained by growing of halftone dots (third step).

Change of Halftone Dots Using Parameters

FIGS. 25A to 25D are views showing changes of halftone dots when the CHS creation parameters acquired in step S30 are changed.

FIG. 25A shows a gradation image (original image) which expresses values ranging from 128 to 255 of 8-bit luminance data. FIG. 25B shows a halftone dot image when the minimum halftone dot size Cmin=4×4 pixels, the maximum halftone dot size Cmax=12×12 pixels, the cluster size M=4, and the fluctuating range N=1 of the minimum halftone dot size. FIG. 25C shows a halftone dot image when only the minimum halftone dot size Cmin is changed to 6×6 pixels. FIG. 25D shows a halftone dot image when the cluster size M is also changed to 8.

As can be seen from FIGS. 25A to 25D, when the minimum halftone dot size Cmin is increased, the screen ruling lowers, and when the cluster size M is increased, the halftone dot size of a middle tone density increases, and the screen ruling lowers. In this way, by setting the parameters to attain the screen ruling in correspondence with the modulation transfer function (MTF) characteristic of the printer 12, an image can be printed most stably to have high image quality.

Pseudo halftone reproduction using a cluster-halftone screen (CHS) is positioned in between a halftone dot-based AM modulation method and an FM modulation method using error diffusion and blue noise. As described above, since the AM modulation method reproduces halftone using halftone dots of a fixed screen ruling, it can reproduce tones most stably in an electrophotography method, but it generates moiré between patterns or colors having periodicity of an image due to the periodicity of halftone dots. The FM modulation method cannot stably reproduce halftone due to the non-linear characteristics of the electrophotography method. By contrast, according to the aforementioned embodiment, the problems of the AM and FM modulation methods can be solved by using the CHS, and printing with high image quality free from any moiré can be executed in electrophotographic copying machines, MFPs, office-use printers, and the like.

Second Embodiment

Image processing according to the second embodiment of the present invention will be described below. Note that the same reference numerals in the second embodiment denote the same components as in the first embodiment, and a detailed description thereof will not be repeated.

[Expansion of Halftone Dots]

FIG. 26 is a view for explaining expansion of halftone dots in the second embodiment, and shows an example in which halftone dots are expanded to a rectangular shape. FIG. 27 is a view showing a table used to search for an addition pixel.

In the table shown in FIG. 27, an upper column records numerical values indicating a search order, and a lower column records 2-digit numerical values indicating displacement amounts from the centroid of a halftone dot. That is, assuming that a pixel (displacement amount=00) with a search order "1" is a centroid (Xg, Yg) of the halftone dot, a candidate of an addition pixel is a pixel (displacement amount=10) with a search order "2". Therefore, the address of the next pixel is (Xg+1, Yg+0). For PixData of the pixel with the search order "2", that is, PixData(Xg+1, Yg+0)='0', the pixel with the search order "2" is selected as an addition pixel. If PixData(Xg+1, Yg+0)='1', the pixel with the search order "2" is skipped, and a pixel with a search order "3" is checked.

The pixel with the search order "3" is located immediately below the pixel of the centroid in the table shown in FIG. 8, but it is located at a lower right position of the centroid in the table shown in FIG. 27. A pixel with a search order "4" is located at a lower right position of the pixel of the centroid in the table shown in FIG. 8, but it is located immediately below the centroid in the table shown in FIG. 27. Furthermore, a pixel with a search order "5" is located at a lower left position of the pixel of the centroid in the table shown in FIG. 8, but it is located at the second right neighboring position of the centroid (on the right side of the pixel with the search order "2") in the table shown in FIG. 27. That is, whether to set a halftone-dot shape to be a circular shape or rectangular shape can be controlled depending on the setting of the search order.

When a halftone dot is to be expanded to a rectangular shape in this way, the table shown in FIG. 27 can be easily prepared, thus allowing easy system debugging. An initial halftone-dot shape is a rectangular shape, but it is finally changed to a shape of a Voronoi polygon obtained by Voronoi partition. Hence, the influence of the initial rectangular shape is small. However, since an initial centroid is slightly different from that of a Voronoi polygon due to a change in halftone-dot shape, a layout of centroid cannot often have sufficient dispersiveness. In this case, the sufficient dispersiveness can be obtained by executing the CVT described above.

[Shape of Halftone Polygon]

FIG. 28 is a view for explaining formation of a halftone polygon. In the example described in the first embodiment, a halftone polygon nearly similar to a Voronoi polygon is formed as a halftone polygon associated with the Voronoi polygon. In the second embodiment, as shown in FIG. 28, a halftone polygon nearly similar to a polygon (Kasner polygon) that couples midpoints of respective sides of a Voronoi polygon is formed as a polygon associated with the Voronoi polygon. Note that the centroid of the Voronoi polygon matches that of the Kasner polygon.

Assuming that a polygon ABCDE shown in FIG. 28 is a Voronoi polygon, a halftone polygon nearly similar to a Kasner polygon H1H2H3H4H5, which couples midpoints of sides AB, BC, CD, DE, and EA is determined. Since the halftone polygon is determined not to protrude from the Voronoi polygon ABCDE, if it becomes larger than the Kasner polygon, the halftone polygon grows like, for example, a polygon M1M2M3M4M5M6M7M8M9M10.

When halftone polygons nearly similar to Voronoi polygons of the first embodiment are used, white dots are formed as narrow regions along the sides of the Voronoi polygons, as shown in FIG. 19, in a shadow range with large tone values. For this reason, in a shadow range in which tone values are approximate to 100%, tone reproduction tends to be unstable. By contrast, halftone polygons nearly similar to Kasner polygons of the second embodiment form polygonal white dots each having vertices A, B, C, D, and E of a Voronoi polygon as cores, and can improve the stability in a shadow range in which tone values are approximate to 100%.

FIG. 29 is a view showing formation of a halftone polygon when a Voronoi polygon includes shorter sides. Assume that a Voronoi polygon is defined by a heptagon ABCDEFG, and sides BC and GA are extremely shorter than other sides. For example, let L be a length of a certain side. When L and a line segment V which couples the midpoint of that side and a centroid G meet:

$$L/V < \alpha \quad (13)$$

where the predetermined ratio α preferably assumes a value about ¼
the midpoint of the side BC is not used as a vertex of a midpoint polygon.

In FIG. 29, upon comparison between the length L of the side BC or GA and the line segment G which couples the midpoint of the side BC or GA and the centroid G, L<<V. Hence, the midpoints of the sides BC and GA are not used.

FIGS. 30A and 30B are views showing the shapes of halftone polygons nearly similar to Kasner polygons. FIG. 30A shows a state when tone values=40%, and FIG. 30B shows a state when tone values=80%. As can be seen from FIGS. 30A and 30B, white dots having polygonal shapes (at least triangular shapes) are generated even in a shadow range, thus stably reproducing tones.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-269533, filed Oct. 16, 2007, which is hereby incorporated by reference herein in its entirety.

What is claimed is:

1. An image processing apparatus for determining a centroid of a halftone dot and a number of blackened pixels in accordance with image data, comprising:
    a first calculator configured to calculate a centroid of a halftone dot to be processed from image data of pixels included in the halftone dot to be processed;
    a second calculator configured to calculate the number of blackened pixels from the image data of the pixels included in the halftone dot to be processed, wherein the number of blackened pixels indicates a number of pixels to be blackened among the pixels included in the halftone dot to be processed;
    an expander configured to expand the halftone dot by adding a pixel adjacent to the halftone dot to be processed to the halftone dot to be processed; and
    a determiner configured to make the first calculator, the second calculator, and the expander repeat their processes until the number of blackened pixels reaches a predetermined number so as to determine the centroid and the number of blackened pixels,
    wherein the expander adds a pixel, which is closest to the centroid of the halftone dot and is not included in the halftone dot, in a case where either a size of the halftone dot is less than a first size or the number of the blackened pixels is less than the predetermined number, the size of the halftone dot is less than a second size which is larger than the first size, and the first size and the second size are predetermined, and
    wherein at least one of the first calculator, the second calculator, and the determiner is implemented using a processor.

2. The apparatus according to claim 1, further comprising a fluctuating section configured to fluctuate the first size.

3. The apparatus according to claim 1, wherein the expander expands the halftone dot to one of a circular shape and a rectangular shape with reference to a table which describes a search order of the pixel to be added.

4. The apparatus according to claim 1, wherein the second calculator calculates the number of blackened pixels based on the number of pixels included in the halftone dot and a total of image data of these pixels.

5. The apparatus according to claim 1, wherein the expander expands the size of the halftone dot to the first size in a shadow range of the image data, expands the size of the halftone dot to the second size in a highlight range of the image data, and expands the size of the halftone dot to a size which is larger than the first size and less than the second size in a middle tone density range between the shadow range and the highlight range.

6. The apparatus according to claim 1, further comprising an obtaining unit configured to obtain the first size, the second size, and the predetermined number.

7. The apparatus according to claim 1, further comprising:
a partition section configured to Voronoi-partition a halftone screen into polygons to have the centroids of the halftone dots as kernel points; and
a growing section configured to grow halftone dots in shapes associated with the polygons by blackening pixels included in the polygons in accordance with the number of the blackened pixels to have centroids of the polygons as centers of growth.

8. The apparatus according to claim 7, wherein the growing section grows the halftone dots in shapes nearly similar to the polygons.

9. The apparatus according to claim 7, wherein the growing section grows the halftone dots in shapes nearly similar to Kasner polygons of the polygons.

10. The apparatus according to claim 9, wherein the growing section does not adopt, as a vertex of the Kasner polygon, a midpoint of a side, when a ratio between a length of that side of the polygon and a distance from the midpoint of that side to the centroid of the polygon does not reach a predetermined value.

11. An image processing method of determining a centroid of a halftone dot and a number of blackened pixels in accordance with image data, the method comprising:
using a processor to perform the steps of:
calculating a centroid of a halftone dot to be processed from image data of pixels included in the halftone dot to be processed;
calculating the number of blackened pixels from the image data of the pixels included in the halftone dot to be processed, wherein the number of blackened pixels indicates a number of pixels to be blackened among the pixels included in the halftone dot to be processed;
expanding the halftone dot by adding a pixel adjacent to the halftone dot to be processed to the halftone dot to be processed; and
repeating the processes of the first calculating step, the second calculating step, and the expanding step until the number of blackened pixels reaches a predetermined number to determine the centroid and the number of blackened pixels,
wherein, in the expanding step, a pixel, which is closest to the centroid of the halftone dot and is not included in the halftone dot, is added in a case where either a size of the halftone dot is less than a first size or the number of the blackened pixels is less than the predetermined number, the size of the halftone dot is less than a second size which is larger than the first size, and the first size and the second size are predetermined.

12. A non-transitory computer-readable medium storing a computer-executable program for causing a computer to perform an image processing method of determining a centroid of a halftone dot and a number of blackened pixels in accordance with image data, the method comprising:
calculating a centroid of a halftone dot to be processed from image data of pixels included in the halftone dot to be processed;
calculating the number of blackened pixels from the image data of the pixels included in the halftone dot to be processed, wherein the number of blackened pixels indicates a number of pixels to be blackened among the pixels included in the halftone dot to be processed;
expanding the halftone dot by adding a pixel adjacent to the halftone dot to be processed to the halftone dot to be processed; and
repeating the processes of the first calculating step, the second calculating step, and the expanding step until the number of blackened pixels reaches a predetermined number to determine the centroid and the number of blackened pixels,
wherein, in the expanding step, a pixel, which is closest to the centroid of the halftone dot and is not included in the halftone dot, is added in a case where either a size of the halftone dot is less than a first size or the number of the blackened pixels is less than the predetermined number, the size of the halftone dot is less than a second size which is larger than the first size, and the first size and the second size are predetermined.

* * * * *